(12) United States Patent
Shin et al.

(10) Patent No.: US 11,745,788 B2
(45) Date of Patent: Sep. 5, 2023

(54) STEER-BY-WIRE STEERING DEVICE

(71) Applicant: HL MANDO CORPORATION, Pyeongtaek-si (KR)

(72) Inventors: WooJin Shin, Suwon-si (KR); Min Ho Park, Yongin-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 83 days.

(21) Appl. No.: 17/350,404

(22) Filed: Jun. 17, 2021

(65) Prior Publication Data

US 2021/0394817 A1 Dec. 23, 2021

(30) Foreign Application Priority Data

Jun. 18, 2020 (KR) .......................... 10-2020-0074474

(51) Int. Cl.
*B62D 5/04* (2006.01)
*B62D 5/00* (2006.01)
*F16H 25/20* (2006.01)

(52) U.S. Cl.
CPC ........... *B62D 5/001* (2013.01); *B62D 5/0445* (2013.01); *F16H 25/2015* (2013.01)

(58) Field of Classification Search
CPC ........ B62D 5/0445; B62D 5/001; B62D 3/06; B62D 5/0469; F16H 25/2015; F16H 2025/2031; F16H 2025/2034
See application file for complete search history.

(56) References Cited

U.S. PATENT DOCUMENTS

| 2,417,434 A | * | 3/1947 | Mead .................. F16H 25/2015 |
| | | | 74/89.37 |
| 5,461,935 A | * | 10/1995 | Hill ...................... F16H 25/2015 |
| | | | 74/89.37 |
| 5,957,236 A | * | 9/1999 | Kitazawa ............. B62D 5/0445 |
| | | | 180/444 |

(Continued)

FOREIGN PATENT DOCUMENTS

| DE | 102018103963 A1 | 8/2018 |
| KR | 10-2018-0095335 A | 8/2018 |
| WO | 2020/184883 A1 | 9/2020 |

OTHER PUBLICATIONS

Office Action issued in corresponding German Patent Application No. 102021206212.1, dated Dec. 22, 2021.

*Primary Examiner* — Gregory Robert Weber
(74) *Attorney, Agent, or Firm* — Morgan, Lewis & Bockius LLP

(57) ABSTRACT

A steer-by-wire steering device is provided with: a first stopper shaped hollow; a second stopper shaped hollow and structured such that a steering shaft is coupled to the second stopper, the second stopper including a small diameter portion and a large diameter portion; a nut engaged to a thread formed on an outer circumference surface of the small diameter portion such that the nut is positioned between the first stopper and the large diameter portion of the second stopper; and a hollow guide ring having an outer circumferential surface and an inner circumferential surface, the hollow guide ring provided between a housing and the nut such that the outer circumferential surface is coupled to the housing and the nut is coupled to be supported in the inner circumferential surface in a circumferential direction.

14 Claims, 9 Drawing Sheets

(56) References Cited

U.S. PATENT DOCUMENTS

| | | | | |
|---|---|---|---|---|
| 6,464,421 | B1* | 10/2002 | Kiefer | F16H 25/2015 |
| | | | | 403/299 |
| 7,766,575 | B2* | 8/2010 | Huber | B21K 1/30 |
| | | | | 403/359.1 |
| 10,895,278 | B2* | 1/2021 | Kim | B62D 5/001 |
| 11,204,082 | B2* | 12/2021 | Bonkowski | B62D 5/001 |
| 11,332,182 | B2* | 5/2022 | Ishimura | B62D 1/04 |
| 2009/0114470 | A1* | 5/2009 | Shimizu | B62D 5/04 |
| | | | | 180/444 |
| 2019/0329816 | A1* | 10/2019 | Ko | B62D 5/0424 |
| 2020/0325990 | A1* | 10/2020 | Wilson-Jones | B62D 1/181 |

* cited by examiner

STEER-BY-WIRE STEERING DEVICE

CROSS-REFERENCE TO RELATED APPLICATION

This application claims priority from Korean Patent Application No. 10-2020-0074474, filed on Jun. 18, 2020, which is hereby incorporated by reference for all purposes as if fully set forth herein.

BACKGROUND

Field

Embodiments relate to a steer-by-wire steering device and, more specifically, to a steer-by-wire steering device that may restrict the maximum rotation angle of the steering wheel by a simple structure to thereby provide the driver with a better steering feeling, easily meet the maximum rotation angle corresponding to the requirements for each vehicle type, facilitate part processing and assembly, prevent misassembly between parts and thus enhance mass productivity, and prevent damage to parts and steering wheel idling by impacts at the maximum rotation angle.

Description of Related Art

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to a lack of mechanical connection between the steering wheel and the wheels, the steer-by-wire steering device requires a device that restricts the turn of the steering wheel not to exceed the maximum rotation angle. Conventional rotation restricting devices suffer from tricky manufacture, processing, and assembly of parts and resultantly poor mass productivity, a high likelihood of misassembly of parts and thus failure to meet a predetermined quality, and damage to parts and idling steering wheel by impacts at the maximum rotation angle.

BRIEF SUMMARY

According to embodiments, there may be provided a steer-by-wire steering device that may restrict the maximum rotation angle of the steering wheel by a simple structure to thereby provide the driver with a better steering feeling, easily meet the maximum rotation angle corresponding to the requirements for each vehicle type, facilitate part processing and assembly, prevent misassembly between parts and thus enhance mass productivity, and prevent damage to parts and steering wheel idling by impacts at the maximum rotation angle.

According to an embodiment, there may be provided a steer-by-wire steering device, comprising: a hollow first stopper having at least one recess formed in an inner circumferential surface thereof outwardly in a diameter direction thereof, a hollow second stopper coupled to a steering shaft and including a small diameter portion having at least one support protruding from a first end thereof in an axial direction thereof and inserted to the at least one recess and having a tread on an outer circumferential surface thereof and a large diameter portion provided at a second end, which is opposite the first end, of the small diameter portion, a nut engaged to the thread, and a hollow guide ring having an outer circumferential surface coupled to a housing and an inner circumferential surface to which the nut is coupled to be supported in a circumferential direction.

According to the embodiments, it is possible to restrict the maximum rotation angle of the steering wheel by a simple structure to thereby provide the driver with a better steering feeling, easily meet the maximum rotation angle corresponding to the requirements for each vehicle type, facilitate part processing and assembly, prevent misassembly between parts and thus enhance mass productivity, and prevent damage to parts and steering wheel idling by impacts at the maximum rotation angle.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
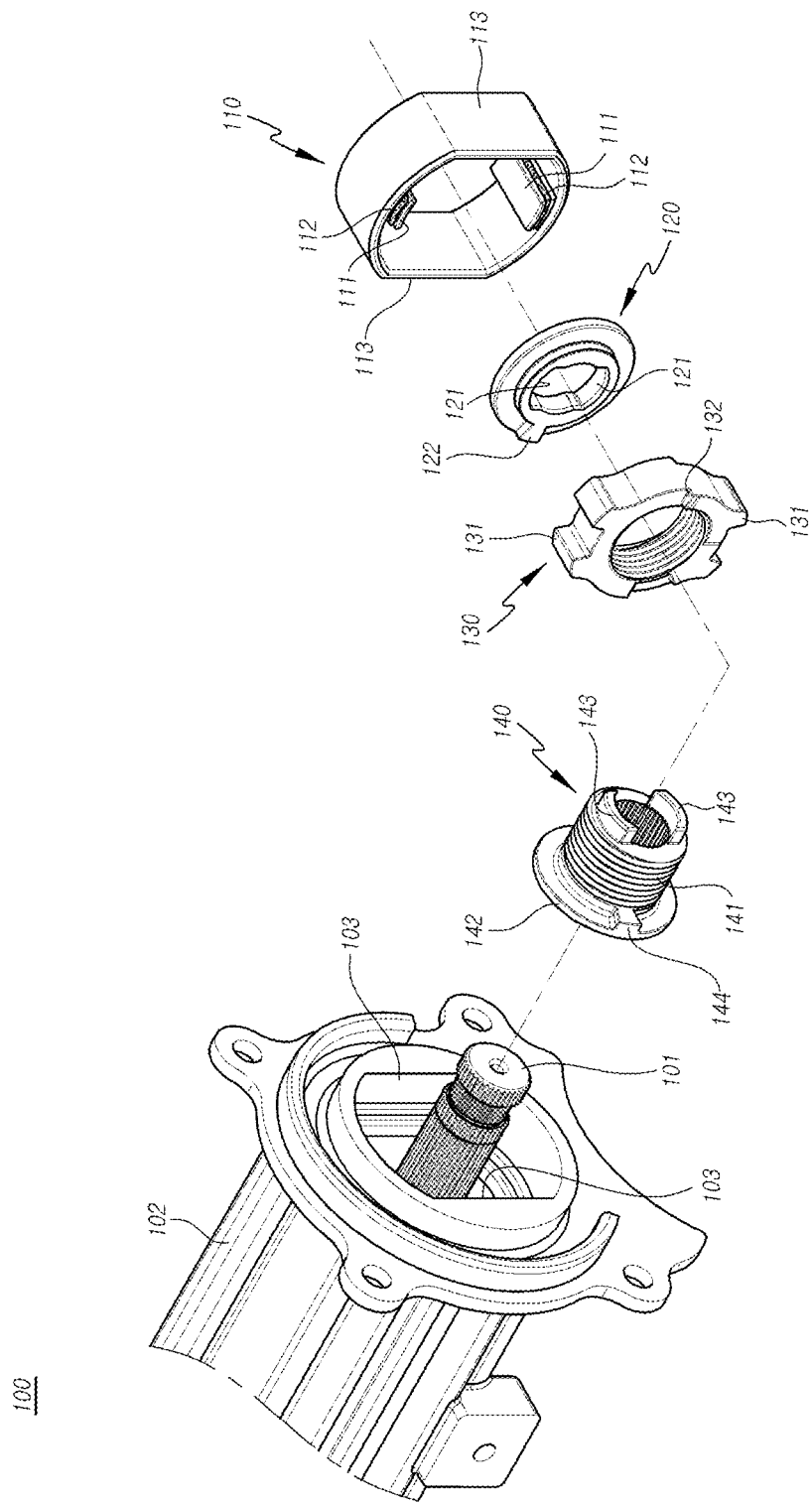
FIG. 1 is an exploded perspective view illustrating a steer-by-wire steering device according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
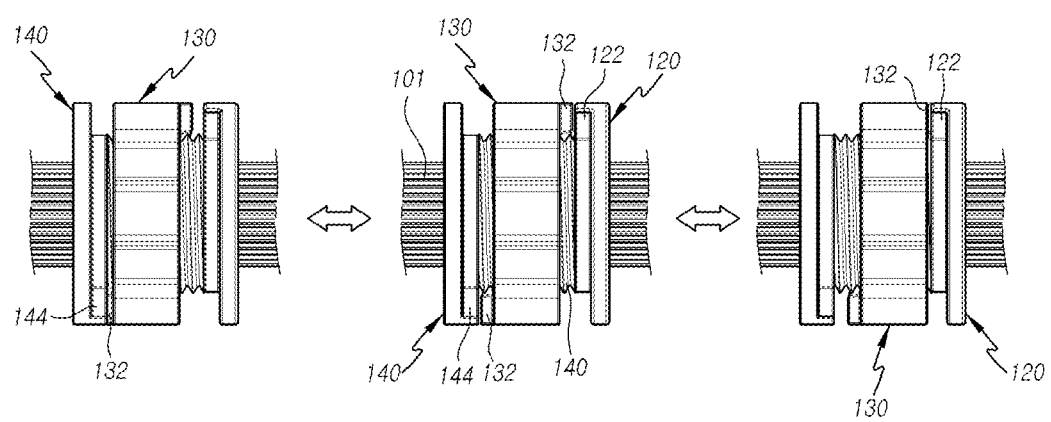
FIG. 2 is a side view illustrating an operating state of a portion of FIG. 1.
Figure 3:
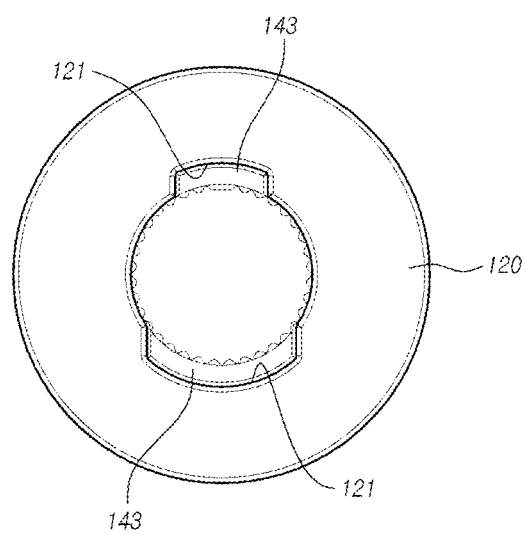
FIGS. 3 and 4 are front views illustrating a portion of a steer-by-wire steering device according to an embodiment.
Figure 4:
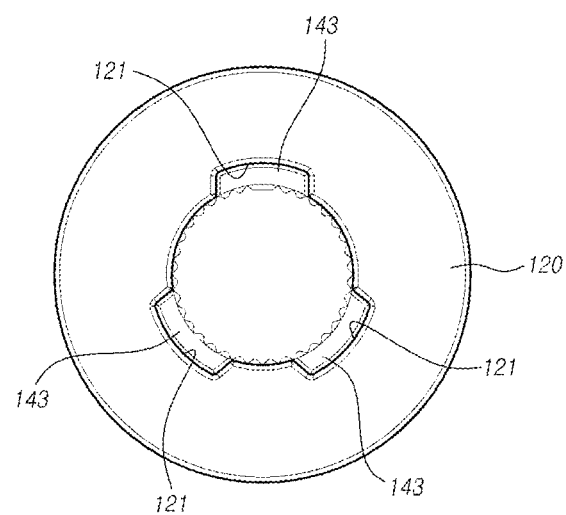
Figure 5:
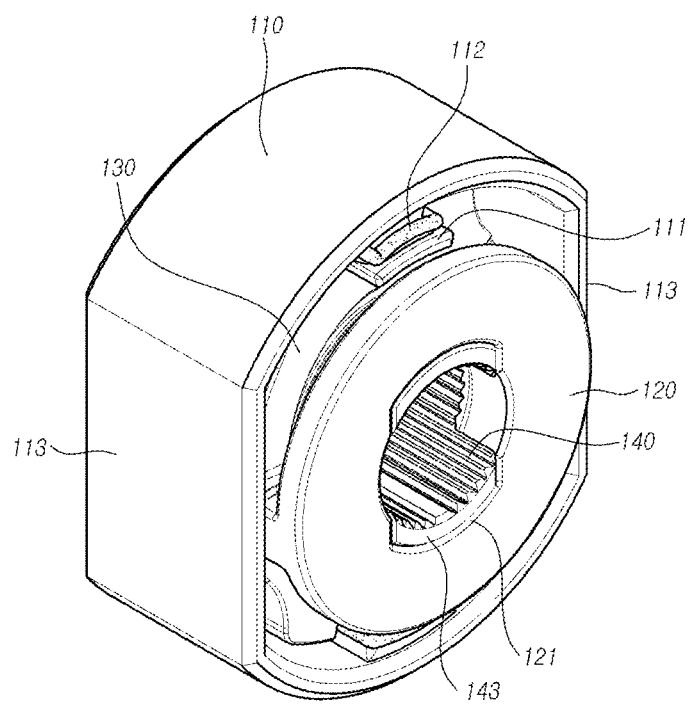
FIG. 5 is a perspective view illustrating a portion of FIG. 1.
Figure 6:
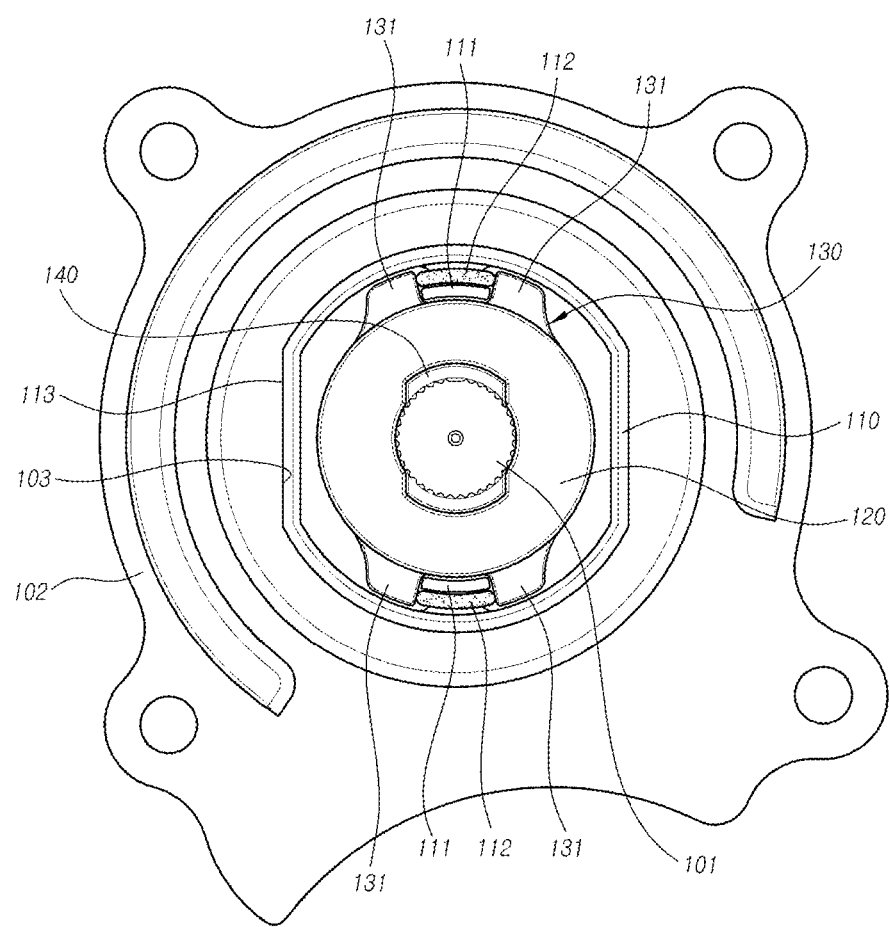
FIG. 6 is a front view illustrating a combined state of FIG. 1.
Figure 7:
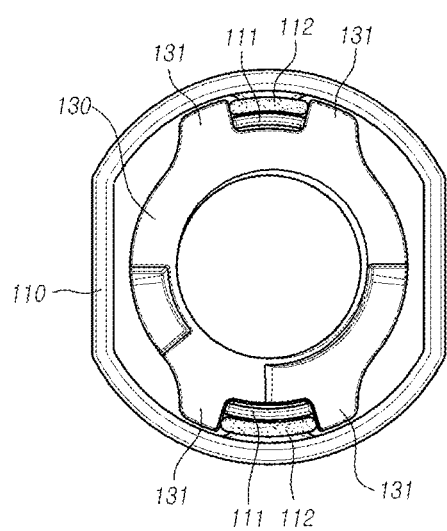
FIGS. 7 and 8 are front views illustrating a portion of a steer-by-wire steering device according to an embodiment.
Figure 8:
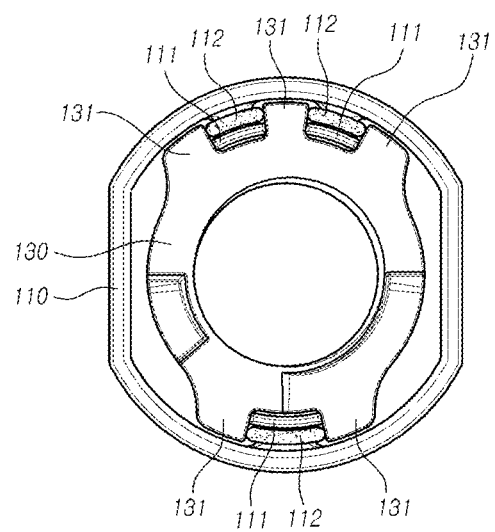
Figure 9:
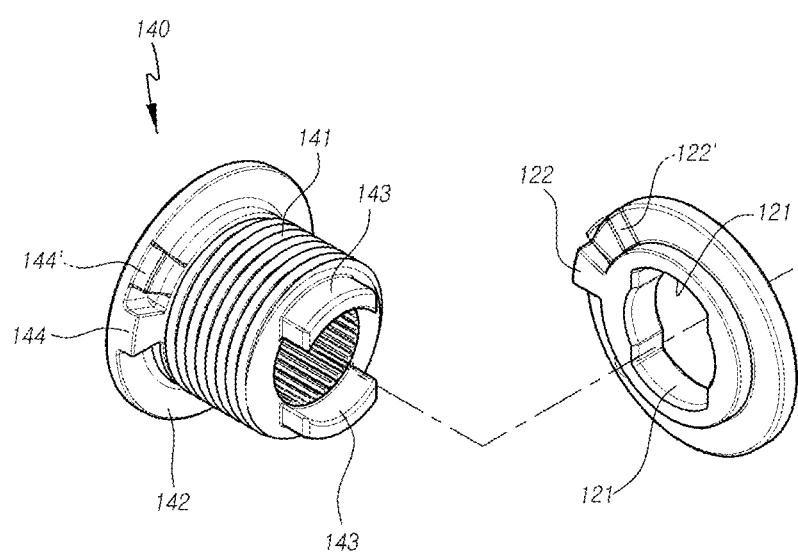
FIG. 9 is a perspective view illustrating a portion of a steer-by-wire steering device according to an embodiment.

FIG. 1 is an exploded perspective view illustrating a steer-by-wire steering device according to an embodiment. FIG. 2 is a side view illustrating an operating state of a portion of FIG. 1. FIGS. 3 and 4 are front views illustrating a portion of a steer-by-wire steering device according to an embodiment. FIG. 5 is a perspective view illustrating a portion of FIG. 1. FIG. 6 is a front view illustrating a combined state of FIG. 1. FIGS. 7 and 8 are front views illustrating a portion of a steer-by-wire steering device according to an embodiment. FIG. 9 is a perspective view illustrating a portion of a steer-by-wire steering device according to an embodiment.

According to an embodiment, a steer-by-wire steering device 100 includes a hollow first stopper 120 having recesses 121 formed in an inner circumferential surface outwardly in a diameter direction thereof, a hollow second stopper 140 coupled to a steering shaft 101 and including a small diameter portion 141 having supports 143 protruding from a first end thereof in an axial direction thereof and inserted to the recesses 121 and having a tread on an outer circumferential surface thereof and a large diameter portion 142 provided at a second end, which is opposite the first end, of the small diameter portion 141, a nut 130 engaged to the thread, and a hollow guide ring 110 having an outer circumferential surface coupled to a housing 102 and an inner circumferential surface to which the nut 130 is coupled to be supported in a circumferential direction.

Referring to FIG. 1, the first stopper 120 and the second stopper 140 are hollow. The first stopper 120 is coupled to the second stopper 140, and the first stopper 120-coupled second stopper 140 is coupled to the steering shaft so that the first stopper 120 and the second stopper 140 are rotated along with the steering shaft 101.

Serrations are formed on the outer circumferential surface of the steering shaft 101 and on the inner circumferential surface of the second stopper 140 and are engaged to each other, so that the steering shaft 101 and the second stopper 140 may be couped together by the serrations and fastened in the circumferential direction.

The second stopper 140 may include the small diameter portion 141 and the large diameter portion 142. A thread engaged with the nut 130 is formed on the outer circumferential surface of the small diameter portion 141.

Although not shown in the drawings, a hollow lead screw may be coupled onto the outer circumferential surface of the small diameter portion 141, rather than the outer circumferential surface of the small diameter portion 141 being directly threaded, and such lead screw may be press-fitted over the outer circumferential surface the small diameter portion 141 or may be coupled by a key groove or serration.

The first stopper 120 is coupled to the first end of the small diameter portion 141, and the large diameter portion 142 is provided at the second end of the small diameter portion 141, so that the thread is positioned between the first stopper 120 and the large diameter portion 142.

The recesses 121 are formed in the inner circumferential surface of the first stopper 120, outwardly in the diameter direction, and the supports 143 protrude from the first end of the small diameter portion 141 in the axial direction. The supports 143 are fitted into the recesses 121 so that the first stopper 120 and the second stopper 140 are coupled and rotated together.

The nut 130 is screwed to the thread of the second stopper 140 and is fastened to the guide ring 110 coupled to the housing 120 in the circumferential direction. Thus, when the first stopper 120 and the second stopper 140 are rotated along with the steering shaft 101, the nut 130 is slid in the axial direction by being screwed with the thread of the second stopper 140. The guide ring 110 is described below in detail.

Accordingly, when the steering shaft 101 rotates, the nut 130 slides in the axial direction and is supported on the first stopper 120 or the large diameter portion 142 of the second stopper 140, thus preventing rotation of the first stopper 120, the second stopper 140, and the steering shaft 101 fastened to the second stopper 140 in the circumferential direction and restricting the maximum rotation angle of the steering wheel.

First protrusions 132 are provided on two opposite surfaces in the axial direction. Second protrusions 122 and 144 are provided, in the axial direction, on the respective inner surfaces of the first stopper 120 and the large diameter portion 142, which face the nut 130, so that the first protrusions 132 and the second protrusions 122 and 144 are supported to each other in the circumferential direction, restricting the rotation of the steering shaft 101.

Referring to FIG. 2, the intermediate view illustrates a neutral state in which the steering wheel is not turned. The nut 130 is positioned between the first stopper 120 and the large diameter portion 142 of the second stopper 140. The left and right views each illustrate when the steering wheel reaches the maximum rotation angle in which case the nut 130 slides in the axial direction, and the first protrusions 132 and the second protrusions 122 and 144 are supported in the circumferential direction.

As such, as the first protrusions 132 and the second protrusions 122 and 144 are supported in the circumferential direction, the steering shaft 101 fastened with the second stopper 140 is prevented from rotating.

In other words, the maximum rotation of the steering wheel is varied depending on the position where the first protrusions 132 and the second protrusions 122 and 144 are supported by each other (see FIG. 9). To meet the required maximum rotation angle of the steering wheel and to allow the left and right maximum rotation angles of the steering wheel to be identical to each other, it is critical to precisely align the first stopper 120 and the second stopper 140 so that the second protrusions 122 and 144 are positioned at preset phases.

For conventional steering devices, misassembly is frequent in which the position where the nut is supported on the stoppers is rendered to differ from a preset position due to difficulty in precisely assembling the nut and the stoppers. If such misassembly is found not during assembly but after assembly, the whole steering device should be discarded, causing considerable damage in terms of time and costs.

In the conventional steering devices, a lead screw is directly coupled to the steering shaft to restrict the slide or rotation of the nut engaged to the lead screw, and stoppers are integrally formed with the housing or, although formed separately from the housing, are coupled to the housing without coupling to the lead screw or are coupled to two opposite ends of the lead screw.

In other words, in some conventional steering devices in which stoppers are integrally formed with the housing or stoppers are coupled to the housing without coupling to the lead screw, the nut is inserted between the stoppers or stoppers are individually positioned on two opposite sides of the nut. Thus, it is hard to assemble them so that the nut is positioned in the middle between the stoppers in the neutral state of the steering wheel (in other words, the parts may be prone to be assembled with the nut positioned off the middle due to an assembly error). Further, in other conventional steering devices in which stoppers are coupled to two opposite ends of the lead screw, the stoppers are coupled not to each other but to the lead screw, so that it is difficult to align the phases of the stoppers and a separate process to fasten the stoppers to the lead screw (e.g., forming a pin hole to press-fit a pin) is required which may cause an error.

In particular, in the conventional steering devices in which stoppers are coupled to two opposite ends of the lead screw, the stoppers are coupled to the lead screw by welding or press-fitting and, if a great impact is applied at the maximum rotation angle of the steering wheel, the couplings between the stoppers and the lead screw may be broken, causing the steering wheel to idle.

However, according to an embodiment, the phases of the second protrusions 122 and 144 may be aligned by simply inserting the supports 143 into the recesses 121 and coupling the first stopper 120 and the second stopper 140. Thus, assembly becomes easier, no separate process is necessary, and mass productivity is enhanced.

Further, according to an embodiment, as the large diameter portion 142 and the small diameter portion 141 are integrally formed with each other, and the first stopper 120 and the second stopper 140 are coupled via the recesses 121 and the supports 143, damage to the parts and steering wheel idling may be prevented although a great impact is applied at the maximum rotation angle of the steering wheel.

Preferably, the first stopper 120 includes two or more recesses 121 to distribute the load applied in the circumferential direction between the first stopper 120 and the second stopper 140 to thereby enhance stability and, thus, two or more supports 143 may be provided to be individually inserted into the recesses 121.

FIG. 1 illustrates an embodiment in which two recesses 121 are arranged at equal intervals and have the same width in the circumferential direction.

In the embodiment illustrated in FIG. 1, the first stopper 120 may be coupled to the second stopper 140 even when rotated half a turn. If the first stopper 120 and the second stopper 140 are assembled, with the first stopper 120 rotated half a turn, the distance in which the nut 130 may slide to one side or the other between the first stopper 120 and the large diameter portion 142 increases or decreases. Such a change in the maximum rotation angle upon assembly needs to be prevented.

To address such issues, at least one of the recesses 121 may be formed with a different width, in the circumferential direction, than the other(s) (i.e., all of the recesses 121 do not have the same width in the circumferential direction) as shown in FIG. 3, or at least one inter-recess interval in the circumferential direction may be different from the other(s) (i.e., all of the recesses 121 are not arranged at equal intervals) as shown in FIG. 4.

In this case, the supports 143 are provided to correspond to the widths and positions of the recesses 121.

FIG. 3 illustrates an embodiment in which there are provided two recesses 121 and two supports 143. Referring to FIG. 3, the upper recess 121 is formed with a smaller width, in the circumferential direction, than the lower recess 121, so that the first stopper 120 may be coupled to the second stopper 140 when phase-aligned with the second stopper 140 but not coupled to the second stopper 140 when rotated half a turn or at a different angle.

FIG. 4 illustrates an embodiment in which there are provided three recesses 121 and supports 143. Referring to FIG. 4, the recesses 121 are arranged so that the interval between the two lower recesses 121 is smaller than the other inter-recess intervals, so that the first stopper 120 may be coupled to the second stopper 140 when phase-aligned with the second stopper 140 but not coupled to the second stopper 140 when rotated half a turn or at a different angle.

As such, as the first stopper 120 and the second stopper 140 may be rendered to be assembled together when they are so aligned, misassembly may be fundamentally prevented by the shape of the parts, defects may be reduced, and mass productivity may be enhanced.

Referring to FIGS. 5 and 6, the guide ring 110 is hollow and is provided between the housing 102 and the nut 130. The outer circumferential surface of the guide ring 110 is coupled to the housing 102, and the nut 130 is coupled to be supported on the inner circumferential surface of the guide ring 110.

To fasten the nut-coupled guide ring 110 in the circumferential direction, a first chamfered portion 113 is provided on the outer circumferential surface of the guide ring 110, and the housing 102 has a second chamfered portion 103 supported on the first chamfered portion 113 so that the guide ring 110 is supported on the housing 102 in the circumferential direction by the first chamfered portion 113 and the second chamfered portion 103.

Although not shown in the drawings, the guide ring 110 may be coupled to the housing 102 by, e.g., a pin and a pin hole. However, coupling the guide ring 110 by the first chamfered portion 113 and the second chamfered portion 103 is advantageous in light of convenient processing and reducing parts.

To support the nut 130 on the guide ring 110 in the circumferential direction, a first protrusion 111 is provided inwardly in the diameter direction on the inner circumferential surface of the guide ring 110, and a second protrusion 131 is provided on the outer circumferential surface of the nut 130 to be supported on the first protrusion 111 in the circumferential direction.

In other words, the first protrusion 111 and the second protrusion 131 are supported by each other, and the nut 130 is supported on the guide ring 110 in the circumferential direction while being able to slide on the guide ring 110 in the axial direction.

An elastic member 112 supported on the second protrusion 131 may be coupled to the first protrusion 111. The elastic member 112 may be shaped as a ring to surround the first protrusion 111.

The elastic member 112 may reduce impact or frictional sound between the first protrusion 111 and the second protrusion 131, allowing the driver a better steering feeling.

The second protrusions 131 may be provided on two opposite sides of the first protrusion 111 in the circumferential direction so that the slide of the nut 130 may be smoothly guided by the first protrusion and the second protrusions 131, and the load generated between the nut 130 and the guide ring 110 may be distributed, and stability may be enhanced.

To distribute the load generated between the nut 130 and the guide ring 110 and smoothly support the slide of the nut 130 when the nut 130 slides or the steering wheel reaches the maximum rotation angle, it is preferable that the second protrusions 131 may be individually provided on two opposite sides, in the circumferential direction, of the first protrusion 111, and two or more first protrusions 111 are thus provided.

FIGS. 1, 5, and 6 illustrate an embodiment in which the first protrusions 111 have the same width in the circumferential direction and are arranged at equal intervals.

In the embodiment shown in, e.g., FIG. 1, the nut 130 may be coupled to the guide ring 110 even when rotated half a turn. If the nut 130 is assembled, rotated half a turn from the lead screw 140 in the neutral state, the distance in which the nut 130 may slide to one side or the other in the axial direction increases or decreases as long as the half turn, causing the left and right maximum rotation angles of the steering wheel to differ. Such misassembly needs to be prevented.

To address such issues, at least one of the first protrusions 111 may be formed with a different width, in the circumferential direction, than the other(s) (i.e., all of the first protrusions 111 do not have the same width in the circumferential direction) as shown in FIG. 7, or at least one inter-first protrusion interval in the circumferential direction may be different from the other(s) (i.e., all of the first protrusions 111 are not arranged at equal intervals) as shown in FIG. 8.

In this case, the second protrusions 131 are provided to correspond to the widths and positions of the first protrusions 111.

FIG. 7 illustrates an embodiment in which there are provided one upper first protrusion 111 and one lower first protrusion 111 and two second protrusions 131 on two opposite sides, in the circumferential direction, of each first protrusion 111. Referring to FIG. 7, as the lower first protrusion 111 is formed with a larger width, in the circumferential direction, than the upper first protrusion 111, the nut 130 may be coupled to the guide ring 110 in the neutral state but not when rotated half a turn or at a different angle.

However, in the embodiment illustrated in FIG. 7, if the maximum rotation angle, to the left or right, of the steering wheel, is one full turn or more, even when the nut 130 is rotated a full turn from the screw in the neutral state, the nut 130 might be coupled to the guide ring 110. However, in such a case, the distance in which the nut 130 has slid from the neutral position is large as compared with when the nut 130 is rotated half a turn, misassembly may easily be identified, so that the production rate of defective products may be relatively significantly reduced. Thus, it would suffice to prevent the nut 130 from being coupled to the guide ring 110 when rotated half a turn.

FIG. 8 illustrates an embodiment in which there are provided two upper first protrusions 111 and one lower first protrusion 111, and three upper second protrusions 131 with the upper first protrusions 111 interposed therebetween, and two lower second protrusions 131. As the first protrusions 111 are arranged so that the interval between the upper first protrusions 111 is smaller than the other inter-protrusion intervals, the nut 130 may be coupled to the guide ring 110 in the neutral state but not when rotated half a turn or at a different angle.

As such, as the nut 130 is rendered to be assembled with the guide ring 110 only in the neutral state, misassembly may be fundamentally prevented by the shape of the parts, defects may be reduced, and mass productivity may be enhanced.

Referring to FIG. 9, according to an embodiment, it is possible to easily change the maximum rotation angle of the steering wheel by producing the first stopper 120 and the second stopper 140 so that the second protrusions 122 and 144 differ only in position, thus rendering it possible to easily meet the required maximum rotation angle that differs per vehicle type.

In other words, by repositioning the second protrusions 122 and 144, provided in the first stopper 120 and the large diameter portion 142 of the second stopper 140, in the circumferential direction (see reference numerals 122' and 144'), the first protrusion 132 is supported earlier or later than the second protrusions 122 and 144 when the nut 130 slides, thus increasing or decreasing the maximum rotation angle.

It is preferable that the second protrusion 122 of the first stopper 120 and the second protrusion 144 of the second stopper 140 are moved by the same angle to opposite sides in the circumferential direction to allow the left and right maximum rotation angles of the steering wheel to increase and decrease to the same degree.

The so-shaped steer-by-wire steering device may be may restrict the maximum rotation angle of the steering wheel by a simple structure to thereby provide the driver with a better steering feeling, easily meet the maximum rotation angle corresponding to the requirements for each vehicle type, facilitate part processing, assembly, or alignment, prevent misassembly between parts and thus enhance mass productivity, and prevent damage to parts and steering wheel idling by impacts at the maximum rotation angle.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steer-by-wire steering device, comprising:
a first stopper shaped hollow having at least one recess formed in an inner circumferential surface thereof extending outwardly in a radial direction thereof;
a second stopper shaped hollow and structured such that a steering shaft is coupled to the second stopper, the second stopper including a small diameter portion and a large diameter portion,
wherein the small diameter portion shaped hollow includes at least one support protruding from a first end of the small diameter portion in an axial direction of the second stopper such that the at least one support is inserted into the at least one recess formed in the inner circumferential surface of the first stopper,
the small diameter portion includes a thread formed on an outer circumferential surface of the small diameter portion,
the large diameter portion is provided at a second end of the small diameter portion which is opposite to the first end in the axial direction;
a nut engaged to the thread such that the nut is positioned between the first stopper and the large diameter portion of the second stopper; and
a hollow guide ring having an outer circumferential surface and an inner circumferential surface, the hollow guide ring provided between a housing and the nut such that the outer circumferential surface is coupled to the housing and the nut is coupled to be supported in the inner circumferential surface in a circumferential direction.

2. The steer-by-wire steering device of claim 1, wherein the steering shaft and the second stopper are coupled together via serrations formed on an outer circumferential surface of the steering shaft and an inner circumferential surface of the second stopper.

3. The steer-by-wire steering device of claim 1,
wherein the nut includes a first protrusion and a second protrusion formed on each of two opposite surfaces of the nut in the axial direction, respectively,
the first stopper includes a third protrusion formed on a surface of the first stopper which faces the nut in the axial direction such that the first protrusion and the third protrusion are supported to each other in the circumferential direction and
the second stopper includes a fourth protrusion formed on a surface of the large diameter portion which faces the nut in the axial direction, such that the second protrusion and the fourth protrusion are supported to each other in the circumferential direction.

4. The steer-by-wire steering device of claim 1, wherein the at least one recess of the first stopper includes two or more recesses.

5. The steer-by-wire steering device of claim 4, wherein at least one of the two or more recesses has a different width in a circumferential direction than another recess.

6. The steer-by-wire steering device of claim 4, wherein the two or more recesses are arranged so that at least one inter-recess interval is different than another inter-recess interval.

7. The steer-by-wire steering device of claim 1, wherein a first chamfered portion is provided on the outer circumferential surface of the guide ring, and a second chamfered portion supported on the first chamfered portion is provided on the housing.

8. The steer-by-wire steering device of claim 1, wherein the guide ring includes at least one fifth protrusion formed on the inner circumferential surface of the guide ring inwardly in the radial direction and the nut includes at least one sixth protrusion formed on an outer circumferential surface of the nut such that the at least fifth protrusion and the at least one sixth protrusion are supported to each other in the circumferential direction.

9. The steer-by-wire steering device of claim 8, wherein the guide ring includes an elastic member supported on the at least one sixth protrusion, the elastic member is coupled to the at least one fifth protrusion.

10. The steer-by-wire steering device of claim 8, wherein the at least one sixth protrusion includes two or more sixth protrusions provided on each of two opposite sides of the at least fifth protrusion in the circumferential direction.

11. The steer-by-wire steering device of claim 8, wherein the at least one fifth protrusion includes two or more fifth protrusions.

12. The steer-by-wire steering device of claim 11, wherein at least one of the two or more fifth protrusions has a different width in the circumferential direction than other fifth protrusions.

13. The steer-by-wire steering device of claim 11, wherein the two or more fifth protrusions are arranged at different intervals in the circumferential direction.

14. The steer-by-wire steering device of claim 1, wherein the small diameter portion and the large diameter portion are integrally formed together.

* * * * *